May 29, 1956      A. EFFGEN      2,747,185
MACHINE FOR STAPLING PLASTIC BEADS TO CLOTH
Filed April 29, 1955      2 Sheets-Sheet 1
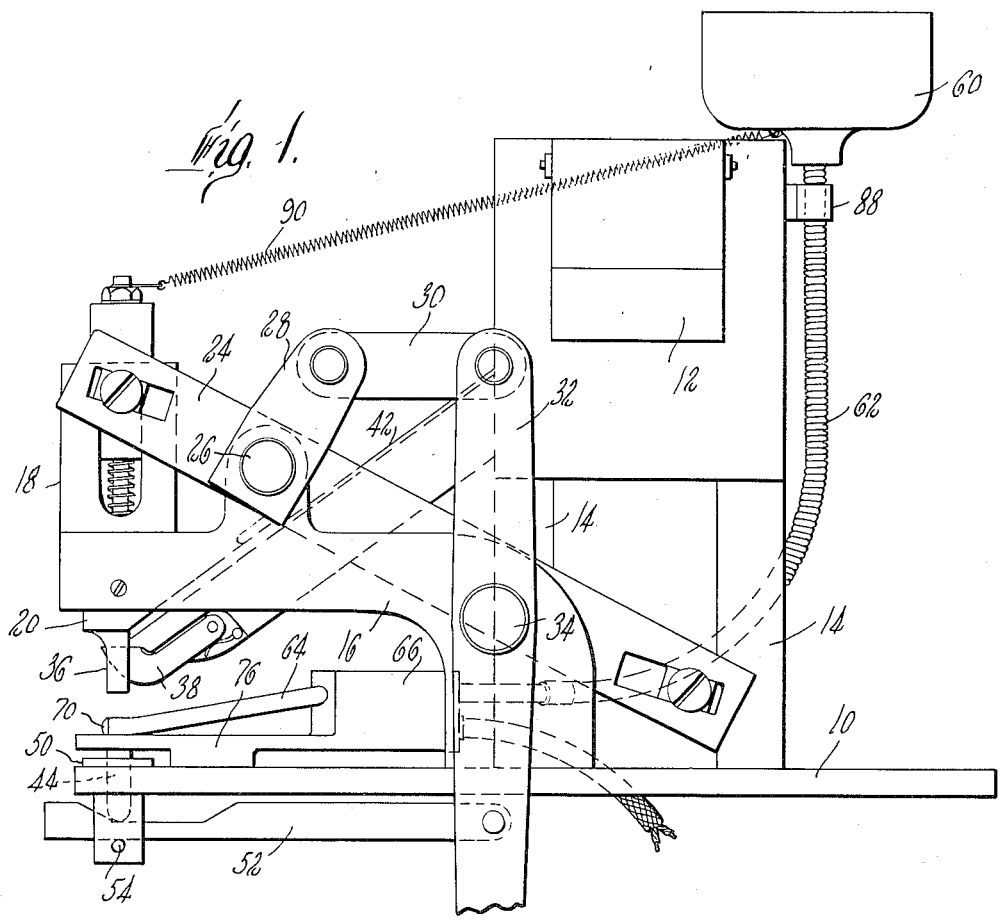
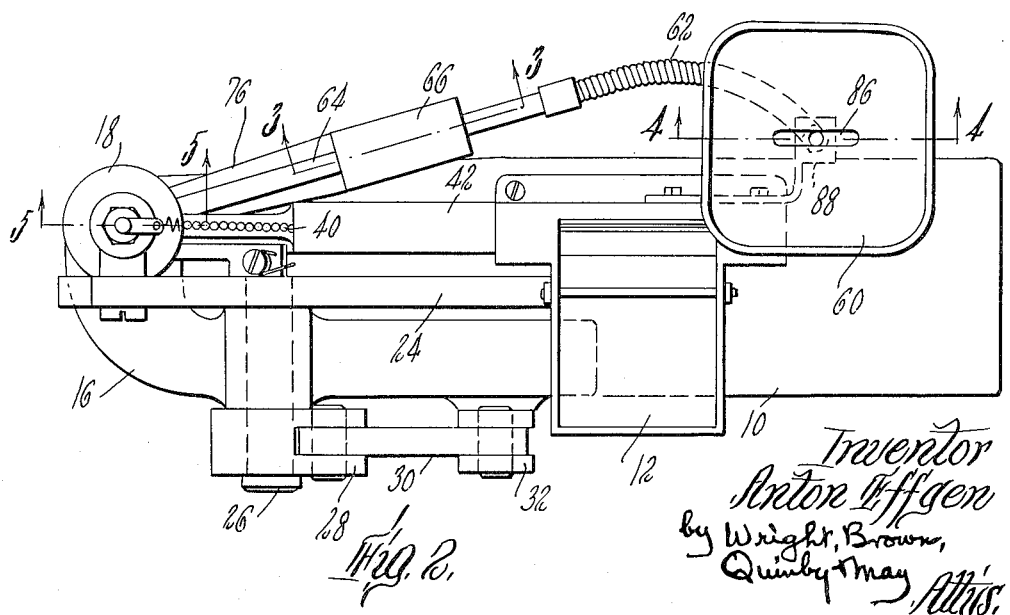

May 29, 1956 — A. EFFGEN — 2,747,185
MACHINE FOR STAPLING PLASTIC BEADS TO CLOTH
Filed April 29, 1955 — 2 Sheets-Sheet 2

Inventor
Anton Effgen
by Wright, Brown,
Quinby & May
Attys.

2,747,185

MACHINE FOR STAPLING PLASTIC BEADS TO CLOTH

Anton Effgen, Westwood, Mass., assignor to Globe Tool and Gauge Works, Boston, Mass., a partnership Application April 29, 1955, Serial No. 504,906

2 Claims. (Cl. 1—3)

This invention relates to a machine for rapidly attaching small, pearl-like beads of a thermoplastic synthetic resin to thin sheet material such as cloth for ornamentation. According to the invention a mechanism is provided for feeding a succession of spherical beads from a hopper to a heating zone and thence to an anvil. A succession of four-pronged staples is fed to a temporary support arranged so that the leading staple is supported between and aligned with the anvil and a vertical driving rod above the anvil. A strip or sheet of cloth or equivalent material is held between the bead on the anvil and the leading staple. The driving rod can then be operated by a treadle or other means to drive the prongs of the staple through the cloth and into the bead. Beads can thus be fastened to the cloth in rapid succession to form any desired ornamental pattern.

For a more complete understanding of the invention reference may be had to the following description thereof and to the drawings, of which—

Figure 1 is a side elevation of a machine embodying the invention;

Figure 2 is a plan view of the same;

Figure 3:
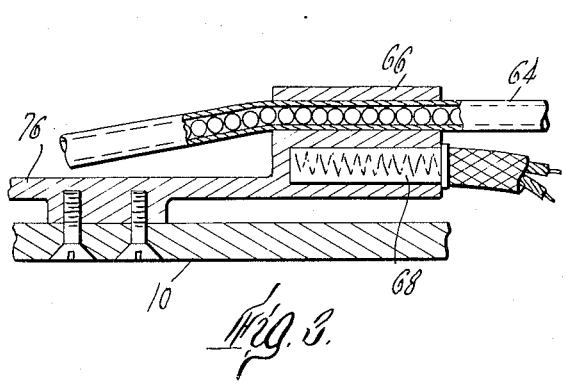
Figure 4:
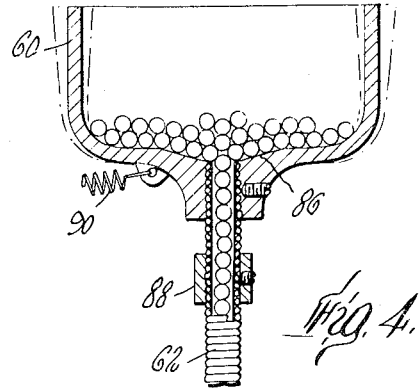
Figure 5:
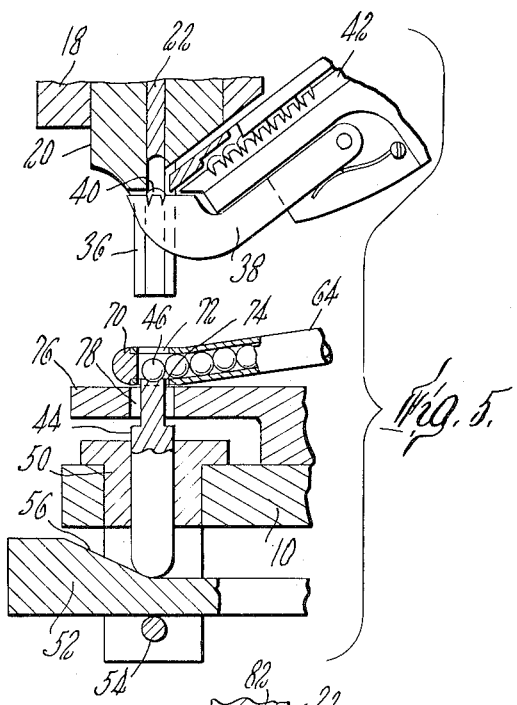
Figure 6:
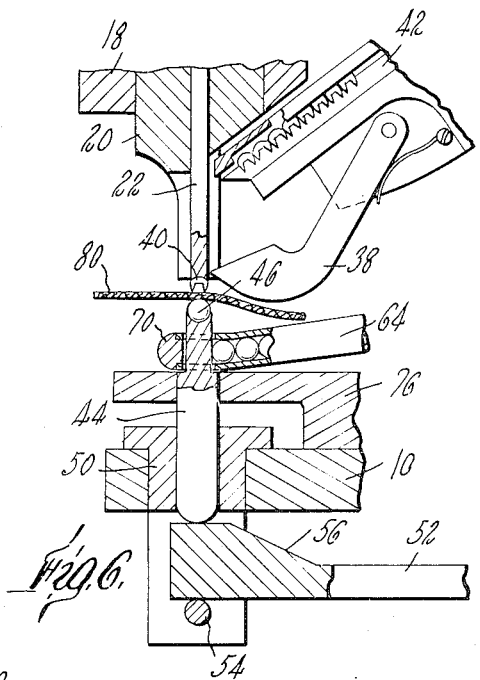
Figure 7:
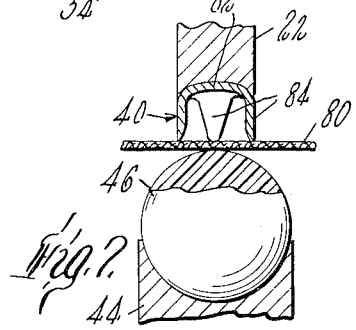
Figure 8:
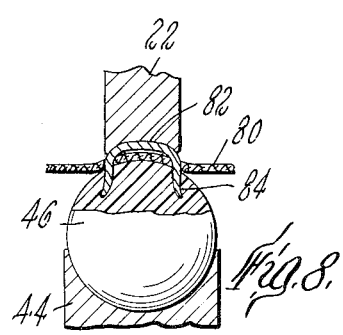

Figures 3, 4 and 5 are sections on the lines 3—3, 4—4, and 5—5, respectively of Figure 2, the scale being somewhat larger;

Figure 6 is similar to Figure 5, but shows the working parts in a different postion of operation; and Figures 7 and 8 are enlarged fragmentary sectional views of a portion of Figure 6, showing two steps in the operation of the machine.

The machine for the most part is similar to that shown and described in United States Patent No. 2,489,764, granted November 29, 1949, and comprises a main frame including a table 10 supported by any suitable means (not shown). A bin 12 is mounted above the table 10 on uprights 14, and a bracket 16 on the table carries a head 18 in which is adjustably mounted a tubular guide member 20. A driving rod 22 slides vertically through the guide member 20 and is reciprocable by a rocking lever 24 pivoted on the main frame at 26. The lever has an arm 28 connected by a link 30 to a vertical lever 32 pivoted at 34 and operated by a treadle (not shown) at its lower end.

The lower end portion 36 of the tubular guide member 20 is of reduced diameter and is longitudinally slotted from its lower end upward to receive a pivoted carrier 38 which holds successive staples 40 arriving from the bin 12 on an inclined rail 42.

Directly below and aligned with the driving rod 22 is a cylindrical anvil 44 having a circular top face which is cupped to receive and support a spherical bead 46, the diameter of the top face being preferably about the same as that of the bead. The anvil 44 is vertically slidable in a bushing 50 set in the table 10. The portion of the bushing below the table is slotted to receive a horizontal slide 52 which is supported by a pin 54. The upper edge of the slide has an inclined cam portion 56 which engages the lower end of the anvil 44 and raises the anvil when the slide is moved toward the right from the position shown in Figure 5. The slide is attached to the lever 32 so that when the latter is rocked to cause the driving rod 22 to descend, the anvil is raised at the same time to the position shown in Figure 6.

A supply of beads 46 is maintained in a hopper 60 from the bottom of which a flexible tube 62 extends to a metal tube 64 which passes through a block 66. The block is of metal and contains a heating unit 68 from which heat is conducted by the block to warm the beads passing through the block in the tube 64. The delivery end of the tube 64 is closed to form a stop member 70. Adjacent to this member are two vertically aligned holes 72 and 74 through the wall of the tube 64, these holes being a little larger than the diameter of bead 46. The block 66 is carried by a bracket 76 mounted on the table 10. One end of this bracket projects over the bushing 50 and has a vertical hole 78 therethrough to guide the anvil 44. The delivery end of the tube 64 rests on this portion of the bracket 76, the holes 72 and 74 being directly above the hole 78. The beads 46 are fed by gravity through the tubes 62 and 64, the leading bead being stopped by the stop member 70 between the holes 72 and 74 so that its rests on the cupped top face of the anvil, as in Figure 5. When the lever 32 is rocked, the anvil rises with a bead on its upper end and at the same time the driving rod 22 pushes down on the leading staple 40 which is supported by the carrier 38. Just before the staple meets the bead, the carrier swings clear, as in Figure 6, and the prongs of the staple are pressed into the bead. If a sheet or strip 80 of cloth or the like has previously been inserted between the guide member 20 and the anvil 44, the prongs of the staple penetrate through the cloth and secure the bead to the under face thereof.

The beads are preferably of uniform size and are of thermoplastic material so that when suitably warmed by the heater 68, they will be soft and receptive to the prongs of the staples. At atmospheric temperatures the beads are quite hard.

The staples illustrated are of a kind known as "nailheads" and are stamped from sheet metal. Each staple has a domed body 82 (Figure 7) from the rim of which project four parallel prongs 84.

To assure continuity of feeding of beads from the hopper 60, a short transverse groove 86 is provided in the bottom floor of the hopper to align the lowermost beads in the hopper. An orifice at the middle of the groove opens into the flexible tube 62 which supports the hopper. A bracket 88 on the main frame grips the tube 62 a short distance below the hopper. To prevent arching of the beads over the orifice the hopper is laterally vibrated by a spring 90 which extends therefrom to the top of the reciprocable assembly which includes the driving rod 22. Every time the rod descends, it pulls the spring 90 which causes the hopper to wobble on the flexible tube 62. This agitates the beads and maintains a constant supply in the groove 86 and bore of the tube 62.

I claim:

1. In a machine having a frame, an anvil on said frame with a cupped top face, means on said frame for driving successive staples toward said anvil, and a chute for guiding a succession of staples to said driving means; a hopper for spherical beads, a tube extending from said hopper to said anvil to guide beads thereto, and means for heating a portion of said tube near the anvil.

2. In a machine having a frame, an anvil on said frame with a cupped top face, means on said frame for driving successive staples toward said anvil, and a chute for guiding a succession of staples to said driving means; a hopper for spherical beads, agitating means for said hopper comprising a tension spring connected at one end to said driving means and at the other end to said hopper, a tube extending from said hopper to said anvil to guide beads thereto, and means for heating a portion of said tube near the anvil.

References Cited in the file of this patent

UNITED STATES PATENTS

| | | |
|---|---|---|
| 575,136 | Temler | Jan. 12, 1897 |
| 1,520,013 | Culotta | Dec. 23, 1924 |
| 2,489,764 | Effgen | Nov. 29, 1949 |
| 2,631,281 | Hardy | Mar. 17, 1953 |